(12) United States Patent
Solanki et al.

(10) Patent No.: US 12,180,030 B2
(45) Date of Patent: Dec. 31, 2024

(54) REEL ASSEMBLY MACHINE

(71) Applicants: TE Connectivity Services GmbH, Schaffhausen (CH); Tyco Electronics (Shanghai) Co., Ltd., Shanghai (CN)

(72) Inventors: Swapnilsinh Solanki, Harrisburg, PA (US); Fengchun Xie, Shanghai (CN); Kevin Keisling, Jonestown, PA (US)

(73) Assignees: Tyco Electronics (Shanghai) Co., Ltd. (CN); TE Connectivity Solutions GmbH (CH)

( * ) Notice: Subject to any disclaimer, the term of this patent is extended or adjusted under 35 U.S.C. 154(b) by 388 days.

(21) Appl. No.: 17/539,591

(22) Filed: Dec. 1, 2021

(65) Prior Publication Data
US 2022/0371855 A1     Nov. 24, 2022

(30) Foreign Application Priority Data
May 21, 2021    (CN) .......................... 202110557736.9

(51) Int. Cl.
| | |
|---|---|
| *B65H 75/14* | (2006.01) |
| *B25J 11/00* | (2006.01) |
| *B25J 15/00* | (2006.01) |
| *B65H 75/44* | (2006.01) |

(52) U.S. Cl.
CPC ............ *B65H 75/14* (2013.01); *B25J 11/005* (2013.01); *B25J 15/0019* (2013.01); *B65H 75/44* (2013.01); *B65H 2402/60* (2013.01); *B65H 2402/80* (2013.01)

(58) Field of Classification Search
CPC ........ B65H 75/14; B65H 75/44; B65H 75/50; B25J 11/005; B25J 15/0019
See application file for complete search history.

(56) References Cited

U.S. PATENT DOCUMENTS

| | | | | |
|---|---|---|---|---|
| 4,412,661 | A | * | 11/1983 | Wise ...................... B65H 75/14 242/608.4 |
| 2007/0262192 | A1 | * | 11/2007 | Derendal ........... B65H 75/2281 242/608.5 |

* cited by examiner

*Primary Examiner* — Sang K Kim

(57) ABSTRACT

A reel assembly machine for assembling a bottom flange and a top flange to a reel core of a reel includes a lower assembly device including a support plate for supporting the bottom flange of the reel. The lower assembly device includes a locating jig for positioning the bottom flange on the support plate. The lower assembly device includes a lower staple gun configured to staple the bottom flange to the reel core. The reel assembly machine includes an upper assembly device including a pressure plate configured to press against the top flange and hold the reel core between the bottom flange and the top flange. The upper assembly device includes an upper staple gun configured to staple the top flange to the reel core.

20 Claims, 4 Drawing Sheets

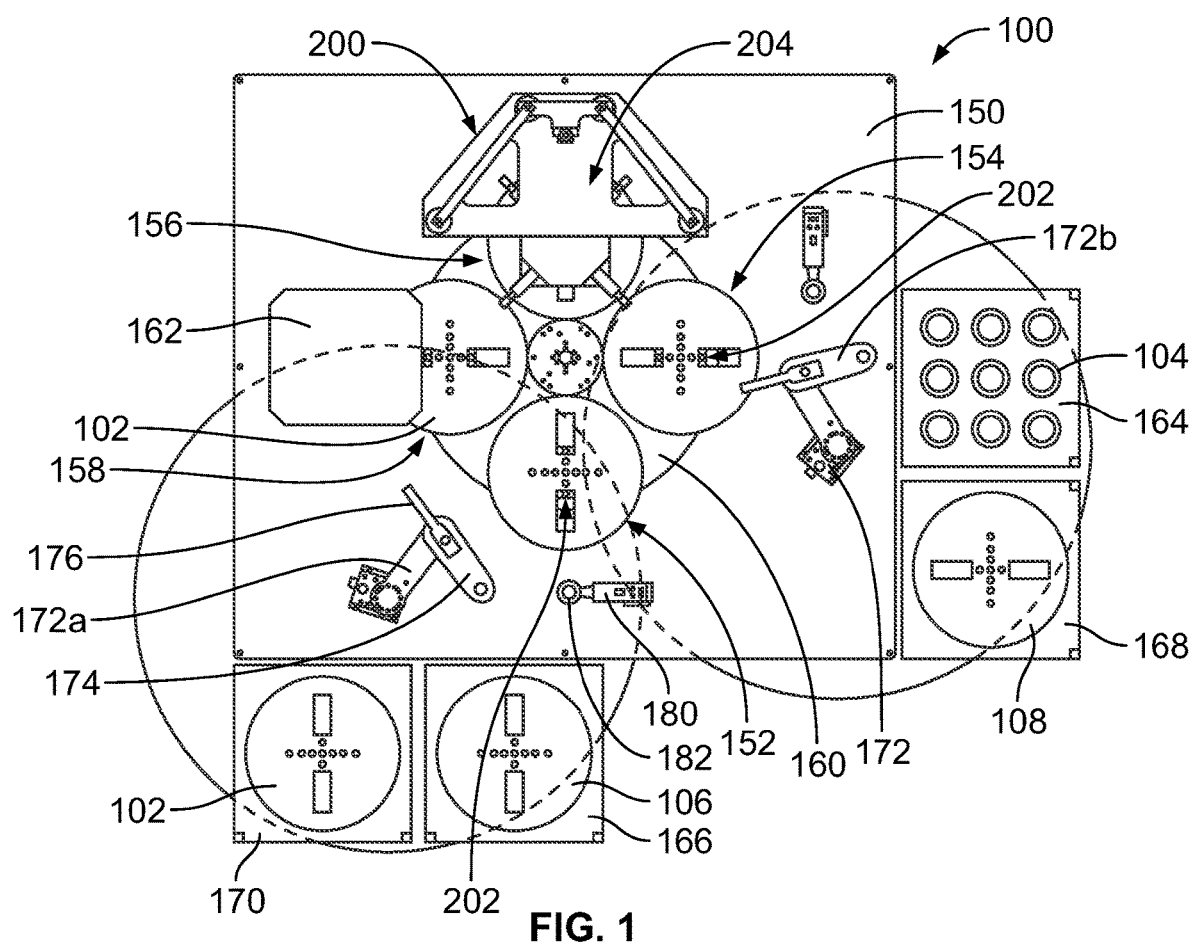
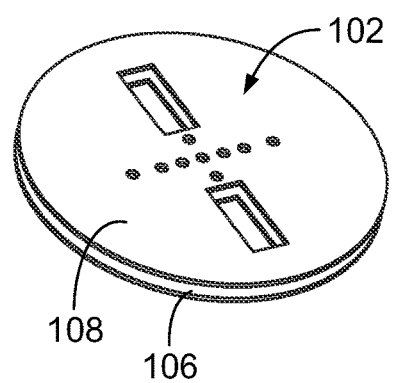
FIG. 2
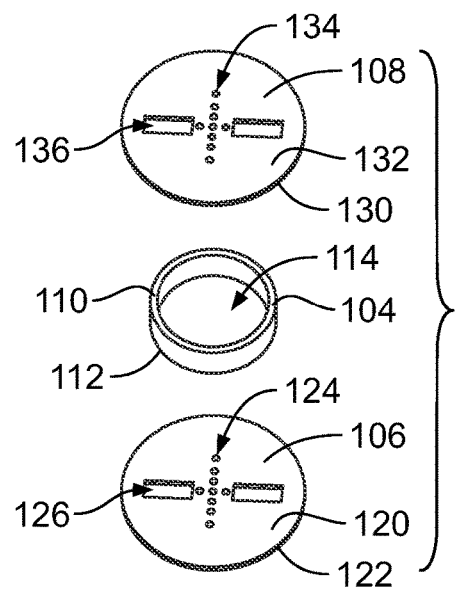
FIG. 3

REEL ASSEMBLY MACHINE

CROSS REFERENCE TO RELATED APPLICATIONS

This application claims benefit to Chinese Application No. 202110557736.9, filed 21 May 2021, the subject matter of which is herein incorporated by reference in its entirety.

BACKGROUND OF THE INVENTION

The subject matter herein relates generally to reel assembly machines.

Cardboard reels are useful to store various types of raw materials and finished goods. The reels are used in high volume for storing and transporting reeled goods, such as contact strips. Many different types and sizes of the reels are used for different goods. Manually assembling the reels is time consuming and leads to inconsistently assembled reels.

A need remains for a reel assembly machine for assembling reels.

BRIEF DESCRIPTION OF THE INVENTION

In one embodiment, a reel assembly machine for assembling a bottom flange and a top flange to a reel core of a reel is provided. The reel assembly machine includes a lower assembly device including a support plate for supporting the bottom flange of the reel. The lower assembly device includes a locating jig for positioning the bottom flange on the support plate. The lower assembly device includes a lower staple gun configured to staple the bottom flange to the reel core. The reel assembly machine includes an upper assembly device including a pressure plate configured to press against the top flange and hold the reel core between the bottom flange and the top flange. The upper assembly device includes an upper staple gun configured to staple the top flange to the reel core.

In another embodiment, a reel assembly machine for assembling a bottom flange and a top flange to a reel core of a reel is provided. The reel assembly machine includes a base having a rotary table including a plurality of reel assembly locations. The rotary table rotates the reel assembly locations between a plurality of assembly stations. The reel assembly machine includes a part manipulator provided adjacent to at least one of the plurality of assembly stations. The part manipulator is configured to move at least one of the bottom flange, the top flange, or the reel core to the corresponding assembly station of the plurality of assembly stations for assembly. The reel assembly machine includes a reel assembly device including a lower assembly device and an upper assembly device. The lower assembly device is coupled to the rotary table of the base and is rotated between the plurality of assembly stations. The lower assembly device includes a support plate for supporting the bottom flange of the reel. The lower assembly device includes a locating jig for positioning the bottom flange on the support plate. The lower assembly device includes a lower staple gun configured to staple the bottom flange to the reel core. The upper assembly device is coupled to the base at the corresponding assembly station of the plurality of assembly stations. The upper assembly device includes a pressure plate configured to press against the top flange and hold the reel core between the bottom flange and the top flange. The upper assembly device includes an upper staple gun configured to staple the top flange to the reel core.

In a further embodiment, a method of assembling a reel is provided and includes loading a bottom flange of the reel onto a support plate of a lower assembly device. The method loads a reel core onto the bottom flange and loads a top flange onto the reel core. The method locates the bottom flange. The reel core and the top flange on the support plate using locating pins of a locating jig and presses the top flange downward toward the reel core and the bottom flange using a pressure plate of an upper assembly device. The method staples the bottom flange to the reel core using a lower staple gun and staples the top flange to the reel core using an upper staple gun.

BRIEF DESCRIPTION OF THE DRAWINGS

FIG. 1 is a schematic view of a reel assembly machine in accordance with an exemplary embodiment.

FIG. 2 is an assembled view of a reel formed by the reel assembly machine in accordance with an exemplary embodiment.

FIG. 3 is an exploded view of the reel in accordance with an exemplary embodiment.

DETAILED DESCRIPTION OF THE INVENTION

Figure 4:
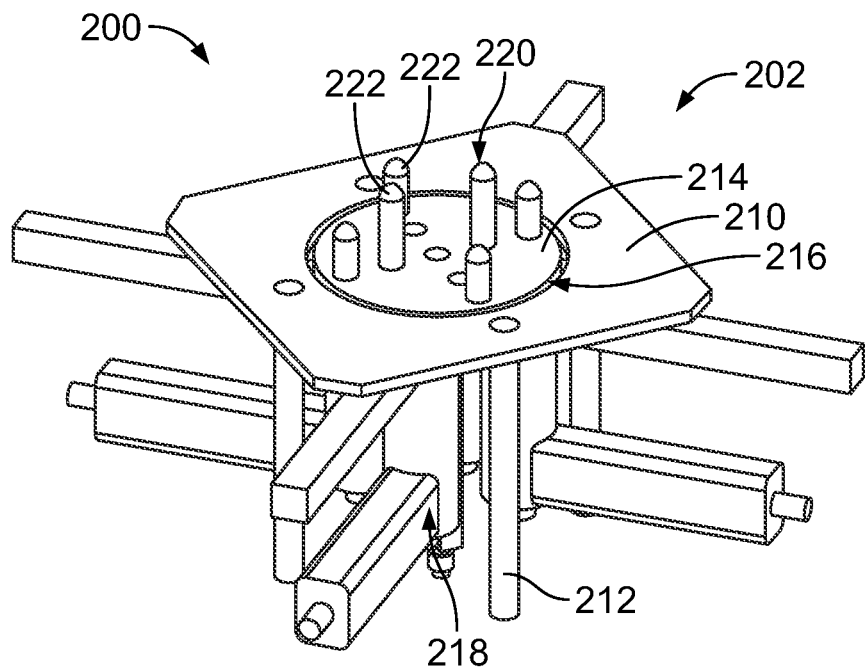
FIG. 4 is a perspective view of the lower assembly device of the reel assembly device in accordance with an exemplary embodiment.

FIG. 1 is a schematic view of a reel assembly machine 100 in accordance with an exemplary embodiment. The reel assembly machine 100 is used to assemble reels 102 that are used for storing various types of rotten finished goods, such as contact strips. The reels 102 are made from various components, which are assembled by the reel assembly machine 100. The reel assembly machine 100 is an automated machine using robotic devices and electronic control to assemble the reels 102. In an exemplary embodiment, the reel assembly machine 100 assembles the reels 102 without human intervention.

FIG. 2 is an assembled view of a reel formed by the reel assembly machine in accordance with an exemplary embodiment. FIG. 3 is an exploded view of the reel in accordance with an exemplary embodiment. The reel 102 includes a reel core 104, a bottom flange 106, and a top flange 108. The bottom and top flanges 106, 108 are coupled to the reel core 104. The reel core 104 separates the bottom and top flanges 106, 108 forming a space that receives the raw or finished goods. The raw or finished goods are wound on the reel core 104 in the space between the bottom and top flanges 106, 108.

The reel core 104 is a hollow, cylindrical disc having a bottom surface 110 and a top surface 112. The reel core 104 includes an opening 114 through the center of the disc. The reel core 104 has a diameter and a width measured between the bottom surface 110 and the top surface 112. The width defines the spacing between the bottom flange 106 and the top flange 108. The reel core 104 includes an inner surface 116 and an outer surface 118. The raw or finished goods are configured to be wound around the outer surface 118.

The bottom flange 106 includes an inner surface 120 and an outer surface 122. The inner surface 120 faces the reel core 104. The bottom flange 106 has a diameter that is greater than the diameter of the reel core 104. In an exemplary embodiment, the bottom flange 106 includes a plurality of openings 124. The openings 124 may receive the clips or other components that are used to lift and/or rotate the reel 102, such as for winding or unwinding the raw or finished goods to or from the reel 102. The openings 124 may be arranged in a particular pattern, such as a linear pattern, a cross pattern, or another pattern. In an exemplary embodiment, windows 126 are provided through the bottom flange 106. The windows allow for visual inspection of the raw or finished goods wound on the reel 102.

The top flange 108 may be similar to the bottom flange 106. In various embodiments, the top flange 108 may be identical to the bottom flange 106. In an exemplary embodiment, the top flange 108 includes an inner surface 130 and an outer surface 132. The inner surface 130 faces the reel core 104. The top flange 108 has a diameter that is greater than the diameter of the reel core 104. In an exemplary embodiment, the top flange 108 includes a plurality of openings 134. The openings 134 may receive the clips or other components that are used to lift and/or rotate the reel 102, such as for winding or unwinding the raw or finished goods to or from the reel 102. The openings 134 may be arranged in a particular pattern, such as a linear pattern, a cross pattern, or another pattern. In an exemplary embodiment, windows 136 are provided through the top flange 108. The windows allow for visual inspection of the raw or finished goods wound on the reel 102.

During assembly, the bottom flange 106 is coupled to the bottom surface 110 of the reel core 104 and the top flange 108 is coupled to the top surface 112 of the reel core 104. For example, the bottom flange 106 may be stapled to the reel core 104 from below and the top flange 108 may be stapled to the reel core 104 from above. The staples may be single leg pins or double leg pins. The staples may have a head to seat against the bottom flange 106 or the top flange 108. The staples may include barbs or other features to interface with the bottom flange 106 or the top flange 108 or the reel core 104. When assembled, the inner surfaces 120, 130 of the bottom and top flanges 106, 108 face each other across a gap that receives the raw or finished goods that are wound on to the reel 102. In various embodiments, the reel core 104 and/or the bottom flange 106 and/or the top flange 108 are manufactured from cardboard. However, the reel core 104 and/or the bottom flange 106 and/or the top flange 108 may be manufactured from other materials, such as wood, plastic or other rigid materials.

Returning to FIG. 1, the reel assembly machine 100 includes a base 150 in various components mounted to the base 150. The reel assembly machine 100 includes a plurality of assembly stations 152, 154, 156, 158 where assembly of the reels 102 occurs. While four assembly stations are provided in the illustrated embodiment, greater or fewer assembly stations may be provided in alternative embodiments. In the illustrated embodiment, the first assembly station 152 is a first loading station, the second assembly station 154 is a second loading station, the third assembly station 156 is a joining station, and the fourth assembly station 158 is a labeling station. Other types of stations may be provided in alternative embodiments.

The reel assembly machine 100 includes a rotary table 160 coupled to the base 150. The rotary table 160 is used to rotate the components and parts between the various assembly stations. The rotary table 160 spins about an axis. The rotary table 160 may be a plate in various embodiments. In other alternative embodiments, the rotary table 160 may be an open frame type structure.

In an exemplary embodiment, the reel assembly machine 100 includes a reel assembly device 200 that supports the parts of the reel 102 and assembles the parts to form the reel 102. In an exemplary embodiment, the reel assembly device 200 includes at least one lower assembly device 202 and an upper assembly device 204. The lower assembly device 202 supports the parts of the reel 102 from below. The upper assembly device 204 supports the parts of the reel 102 from above. During the assembly process, the lower assembly device 202 and the upper assembly device 204 cooperate to assemble the reel 102. For example, the lower assembly device 202 staples the bottom flange 106 to the reel core 104 and the upper assembly device 204 staples the top flange 108 to the reel core 104.

In an exemplary embodiment, a plurality of the lower assembly devices 202 are provided and are coupled to the rotary table 160. The lower assembly devices 202 are rotated between the various assembly stations 152, 154, 156, 158. In an exemplary embodiment, a single upper assembly device 204 is provided, which is coupled to the base 150 at one of the assembly stations, such as the assembly station 156.

In an exemplary embodiment, the reel assembly machine 100 includes a label applicator 162 at one of the assembly stations, such as the assembly station 158. The label applicator 162 is used to apply one or more labels to the reel 102. The label applicator 162 may include a label printer for printing a label, which is adhered to the reel 102, such as the outer surface 132 of the top flange 108. The label may be applied to other surfaces of the reel 102 in alternative embodiments. Other types of labels may be applied to the reel 102 in alternative embodiments. For example, the label may be directly printed onto the reel 102 or may be imprinted into the reel 102.

In an exemplary embodiment, the reel assembly machine 100 includes a reel core cart 164 that holds the reel cores 104, a bottom flange cart 166 that holds the bottom flanges 106, and a top flange cart 168 that holds the top flanges 108. A plurality of the reel cores 104 may be held on the reel core cart 164, such as spaced apart along a surface or shelf of the reel core cart 164. A plurality of the bottom flanges 106 may be held by the bottom flange cart 166, such as in a stack. A plurality of the top flanges 108 may be held by the top flange cart 168, such as in a stack. The carts 164, 166, 168 may be movable relative to the base 150. For example, the carts 164, 166, 168 may be wheeled carts that may be moved into and out of position relative to the base 150. The base may include locating features for positioning the carts 164, 166, 168 relative to the base 150 at predetermined positions. In the illustrated embodiment, the bottom flange cart 166 is located at a different side from the reel core cart 164 and the top flange cart 168. Other arrangements are possible in alternative embodiments. Optionally, the reel assembly machine 100 may include one or more sensors 169 used to sense the parts at the carts 164, 166, 168. For example, the sensors 169 may detect presence of the parts. The sensors 169 may detect locations of the parts. The sensors 169 may detect a height of the stack of the parts to control retrieval of the parts by the reel assembly machine 100.

In an exemplary embodiment, the reel assembly machine 100 includes an assembled reel cart 170 that holds the assembled reels 102 (post-assembly by the reel assembly machine 100). Optionally, multiple assembled reels 102 may be stacked on the assembled reel cart 170. In the illustrated embodiment, the assembled reel cart 170 is provided along the same side as the bottom flange cart 166. Other locations are possible in alternative embodiments.

In an exemplary embodiment, the reel assembly machine 100 includes one or more part manipulators 172 coupled to the base 150. The part manipulators 172 are used to transfer the parts of the reel 102. For example, the part manipulators 172 may transfer the parts between the carts 164, 166, 168 and the reel assembly device 200. The part manipulators 172 may transfer the assembled reel 102 from the reel assembly device 200 to the assembled reel cart 170. In the illustrated embodiment, two part manipulators 172 are provided. Greater or fewer part manipulators 172 may be used in alternative embodiments. For example, a single part manipulator 172 may be used to transfer all of the parts. However, in the illustrated embodiment, each part manipulator 172 is used to transfer multiple parts. For example, the first part manipulator 172a is used to transfer the bottom flanges 106 from the bottom flange cart 166 to the reel assembly device 200 at the first assembly station 152 and is used to transfer the assembled reels 102 from the reel assembly device 200 at the first assembly station 152 to the assembled reel cart 170. The second part manipulator 172b is used to transfer the reel cores 104 from the reel core cart 164 to the reel assembly device 200 at the second assembly station 154 and is used to transfer the top flanges 108 from the top flange cart 168 at the second assembly station 154. The part manipulators 172 may operate simultaneously to speed the assembly process. The part manipulators 172 are spaced apart from each other to avoid interfering with each other during operation.

In an exemplary embodiment, each part manipulator 172 is a multi-axis robot. The part manipulator 172 includes an arm 174 movable in three-dimensional space and an end effector 176 at the distal end of the arm 174 that is used to pick up and move the parts. The end effector 176 may be a vacuum device used to pick up the parts by suction or vacuum pressure in various embodiments. The end effector 176 is moved by the arm 174 to pick up the part and to set down the part at appropriate locations. For example, the end effector 176 may be moved by the arm 174 to pick up the part from the corresponding cart 164, 166, 168 and move the part to the lower assembly device 202 at the rotary table 160. The part manipulator 172 is configured to move the part in three-dimensional space, such as up and down, side to side, and the like. In an exemplary embodiment, the part manipulator 172 is configured to rotate the part to change the angular position of the part relative to the lower assembly device 202 for proper positioning of the part relative to the lower assembly device 202. Other types of part manipulators may be used in alternative embodiments.

In an exemplary embodiment, the reel assembly machine 100 includes one or more vision devices 180 used to control operation of the part manipulators 172. The vision device 180 is used to image the part to control operation of the part manipulator 172. For example, the vision device 180 includes a camera 182. The vision device 180 may be coupled to the base 150. Alternatively, the vision device 180 may be coupled to the part manipulator 172, such as coupled to the arm 174 to image the part held by the end effector 176. The part is presented to the camera 182 and the image is taken. The controller for the part manipulator 172 analyzes the image to determine proper steps to present the part to the lower assembly device 202. For example, the part may be rotated or otherwise moved based on the image taken to properly orient the part relative to the lower assembly device 202 (for example, to align locating features of the part and the lower assembly device 202). The image of the part may be taken as the part is transferred between the cart 164, 166, 168 and the assembly station. In various embodiments, the imaging may be performed continuously and/or in real time as the part is presented to the lower assembly device 202.

Figure 5:
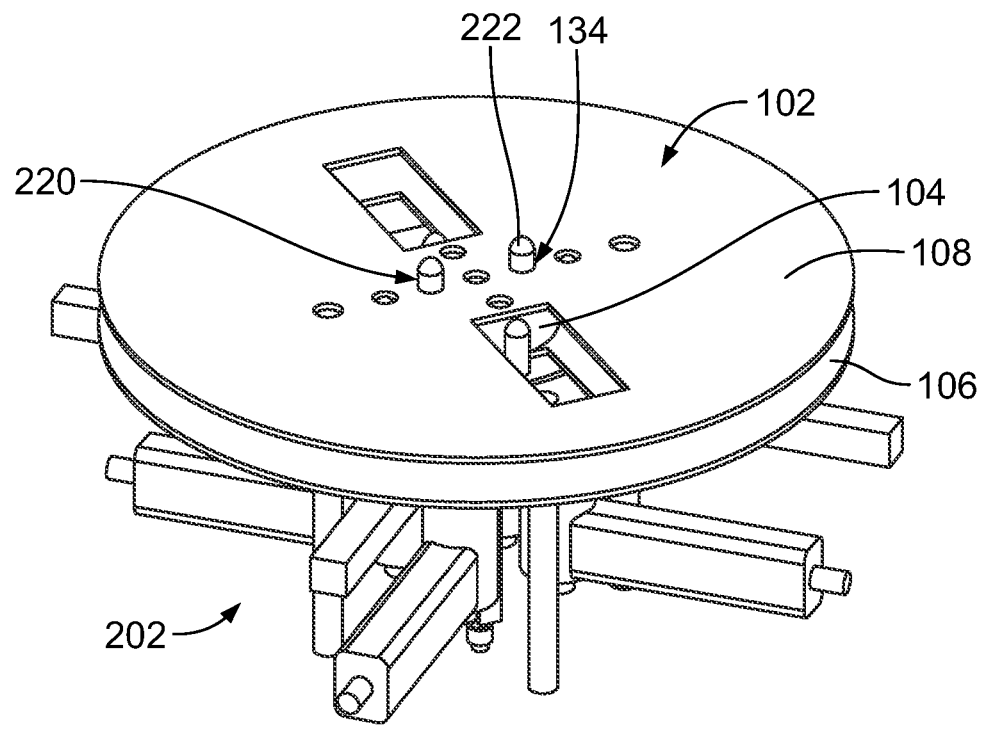
FIG. 5 is a perspective view of the lower assembly device supporting the parts of the reel in accordance with an exemplary embodiment.

FIG. 4 is a perspective view of the lower assembly device 202 of the reel assembly device 200 in accordance with an exemplary embodiment. FIG. 5 is a perspective view of the lower assembly device 202 supporting the parts of the reel 102.

The lower assembly device 202 includes a support plate 210, support columns 212 extending from the support plate 210, a rotary plate 214 rotatable relative to the support plate 210, lower staple guns 218 located below the support plate 210 and/or the rotary plate 214, and a locating jig 220 extending from the rotary plate 214.

The support plate 210 is used to support the reel 102. During assembly, the bottom flange 106 is loaded onto the support plate 210. The support plate 210 supports the bottom flange 106 from below. The support columns 212 are used to support the support plate 210 at an elevated position. In an exemplary embodiment, the support columns 212 are coupled to the rotary table 160 (shown in FIG. 1) and hold the support plate 210 in the elevated position to accommodate the lower staple guns 218. Other types of support structures may be provided in alternative embodiments.

The rotary plate 214 is located in an opening 216 in the support plate 210. The rotary plate 214 is used to rotate the reel 102 relative to the support plate 210, such as to apply staples at different positions during assembly. In the illustrated embodiment, the rotary plate 214 is located at a center of the support plate 210. Other locations are possible in alternative embodiments. Optionally, an upper surface of the rotary plate 214 may be generally flush with the upper surface of the support plate 210. The rotary plate 214 may support the parts of the reel 102, such as the bottom flange 106 and the reel core 104 and the top flange 108.

In an exemplary embodiment, the lower assembly device 202 includes a plurality of the lower staple guns 218 to apply staples at different positions around the reel 102. The staples secure the bottom flange 106 to the reel core 104. In the illustrated embodiment, four lower staple guns 218 are provided. Greater or fewer lower staple guns 218 may be provided in alternative embodiments.

The locating jig 220 is provided above the support plate 210 and the rotary plate 214 to interface with the parts of the reel 102. The locating jig 220 is used to locate the reel 102 relative to the lower assembly device 202. In the illustrated embodiment, the locating jig 220 includes a plurality of locating pins 222 extending from the upper surface of the rotary plate 214. The locating pins 222 may have rounded distal ends to guide mating with the part of the reel 102. The locating pins 222 are received in corresponding openings 124, 134 in the bottom and top flanges 106, 108. The locating pins 222 interface with the bottom and top flanges 106, 108 to locate the bottom and top flanges 106, 108 relative to each other and relative to the reel core 104. In an exemplary embodiment, the locating pins 222 interface with the reel core 104 to position the reel core 104 relative to the bottom and top flanges 106, 108. For example, the locating pins 222 may engage the inner surface 116 and/or the outer surface 118 (both shown in FIG. 3) to center the reel core 104 on the rotary plate 214. Optionally, the locating pins 222 may have different heights. For example, the taller locating pins 222 extend entirely through the reel 102, such as through the bottom flange 106 and through the top flange 108. The shorter locating pins 222 may extend through the bottom flange 106 to interface with the reel core 104 do not extend through the top flange 108. Other arrangements are possible in alternative embodiments. Other types of locating features may be used with the locating jig 220 to locate the part of the reel 102 relative to each other and relative to the lower assembly device 202.

Figure 6:
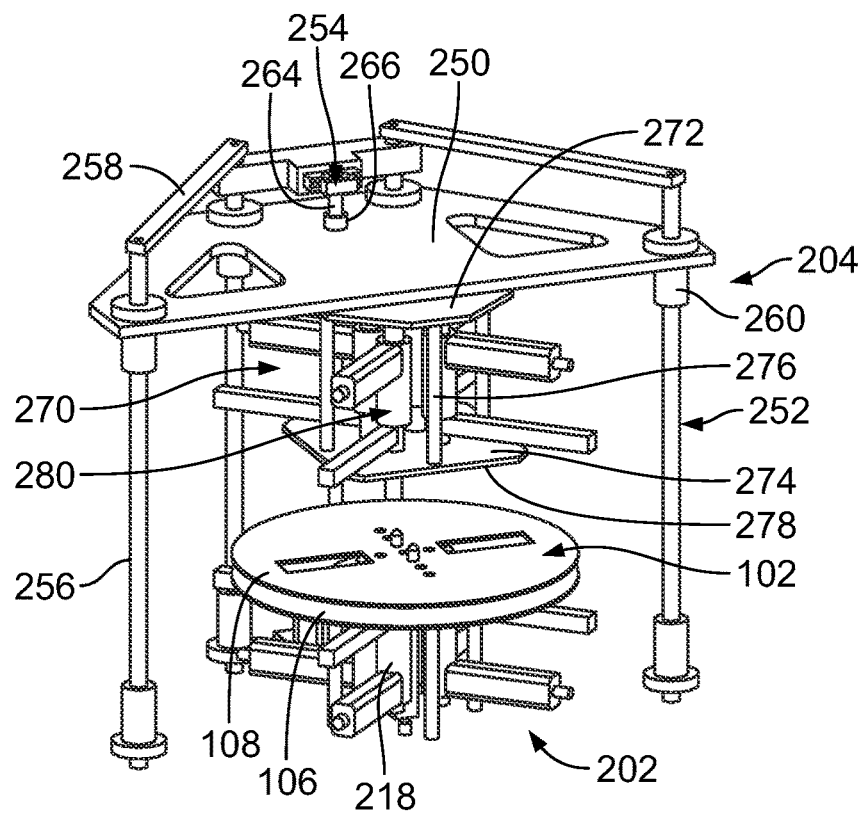
FIG. 6 is a perspective view of the upper assembly device in accordance with an exemplary embodiment.
Figure 7:
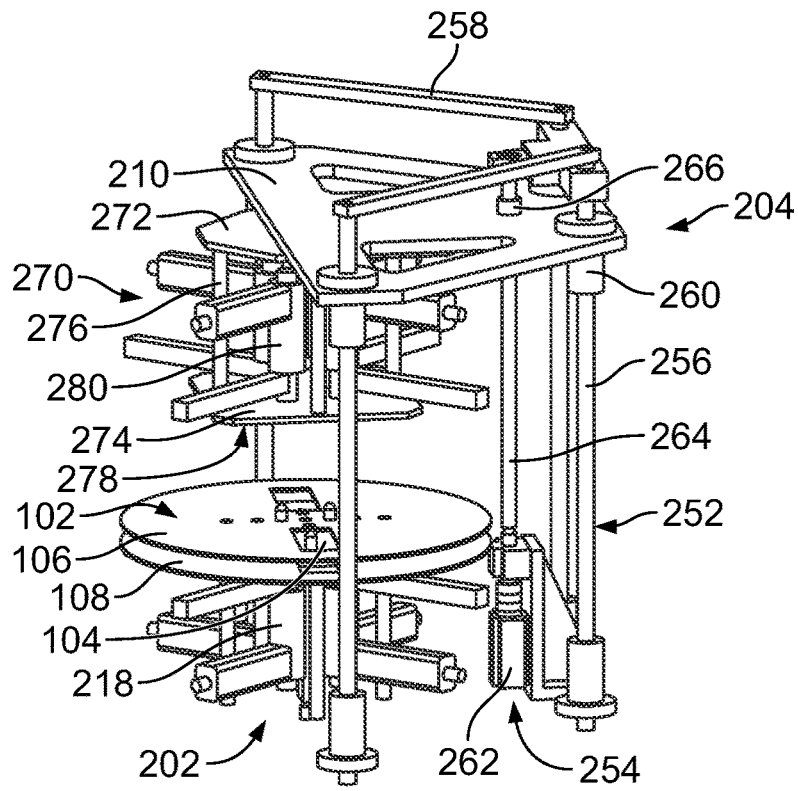
FIG. 7 is another perspective view of the upper assembly device in accordance with an exemplary embodiment.

FIG. 6 is a perspective view of the upper assembly device 204 in accordance with an exemplary embodiment. FIG. 7 is another perspective view of the upper assembly device 204 in accordance with an exemplary embodiment. FIGS. 6 and 7 illustrate the upper assembly device 204 relative to the lower assembly device 202. The upper assembly device 204 is used to secure the top flange 108 to the reel core 104.

The upper assembly device 204 includes a pressure plate 250 holding a securing mechanism 270 used to secure the top flange 108 to the reel core 104. The upper assembly device 204 includes a rail mechanism 252 supporting the pressure plate 250 and an actuator 254 used to raise and lower the pressure plate 250 along the rail mechanism 252.

The rail mechanism 252 includes a plurality of columns 256 extending vertically and support beams 258 extending between the columns 256. The columns 256 in the support beams 258 form a frame structure that supports the pressure plate 250. The columns 256 are configured to be coupled to the base 150 (shown in FIG. 1) to position the upper assembly device 204 at the assembly station 156 (shown in FIG. 1). In an exemplary embodiment, bushings 260 are coupled to the pressure plate 250. The bushings 260 slide along the columns 256 as the pressure plate 250 is raised and lowered during operation. The actuator 254 is coupled to the pressure plate 250 to raise and lower the pressure plate 250. In the illustrated embodiment, the actuator 254 includes an electric motor 262 and a drive screw 264 rotated by the electric motor 262. A drive nut 266 is mounted to the pressure plate 250 and operably coupled to the drive screw 264. As the drive screw 264 rotates, the drive nut 266 is moved up or down along the drive screw 264 to move the pressure plate 250. Other types of actuators may be provided in alternative embodiments.

The securing mechanism 270 is coupled to the pressure plate 250 and movable with the pressure plate 250. The securing mechanism 270 includes a mounting plate 272, a platform 274, and support beams 276 extending between the mounting plate 272 and the platform 274. The mounting plate 272 is mounted to the pressure plate 250. The platform 274 is spaced apart from the mounting plate 272 and positioned below the mounting plate 272. The platform 274 has a bottom surface 278 configured to interface with the reel 102. The platform 274 is configured to be pressed downward against the top flange 108 of the reel 102 when the pressure plate 250 is actuated downward. The reel 102 is sandwiched between the support plate 210 of the lower assembly device 202 and the platform 274 of the upper assembly device 204.

In an exemplary embodiment, the securing mechanism 270 includes a plurality of upper staple guns 280. The upper staple guns 280 are located between the platform 274 and the mounting plate 272. The support beams 276 form a space to accommodate the upper staple guns 280 between the platform 274 and the mounting plate 272. In an exemplary embodiment, the upper assembly device 204 includes a plurality of the upper staple guns 280 to apply staples at different positions around the reel 102. The staples secure the top flange 108 to the reel core 104. In the illustrated embodiment, four upper staple guns 280 are provided. Greater or fewer upper staple guns 280 may be provided in alternative embodiments.

During assembly, the actuator 254 is operated to drive the pressure plate 250 downward to press against the reel 102. The platform 274 engages the outer surface of the top flange 108 of the reel 102. Optionally, the platform 274 may compress the reel 102 between the support plate 210 of the lower assembly device 202 and the platform 274 of the upper assembly device 204. The lower staple guns 218 and the upper staple guns 280 are operated to staple the bottom flange 106 and the top flange 108 to the reel core 104. In an exemplary embodiment, after the first set of staples are fired, the lower assembly device 202 rotates the reel 102 a predetermined amount, such as 45°, to change the position of the reel 102 relative to the lower staple guns 218 and the upper staple guns 280. The lower staple guns 218 and the upper staple guns 280 are operated a second time to provide additional staples to the bottom flange 106 and the top flange 108. Optionally, greater than two sets of staples may be applied to secure the bottom flange 106 and the top flange 108 to the reel core 104. For example, the lower assembly device 202 may rotate the reel 102 more than once to additional stapling positions.

After stapling, the actuator 254 is operated to drive the pressure plate 250 upward to release the reel 102 from the upper assembly device 204. Once clear, the rotary table 160 (shown in FIG. 1) rotates the lower assembly device 202 and the assembled reel 102 to a different assembly station, such as the assembly station 158 (shown in FIG. 1). The assembled reel 102 may be removed from the lower assembly device 202 at the next assembly station 158. In alternative embodiments, the assembled reel 102 may be removed from the lower assembly device 202 from the assembly station having the upper assembly device 204 without rotating the lower assembly device 202 and the reel 102 away from the upper assembly device 204.

Figure 8:
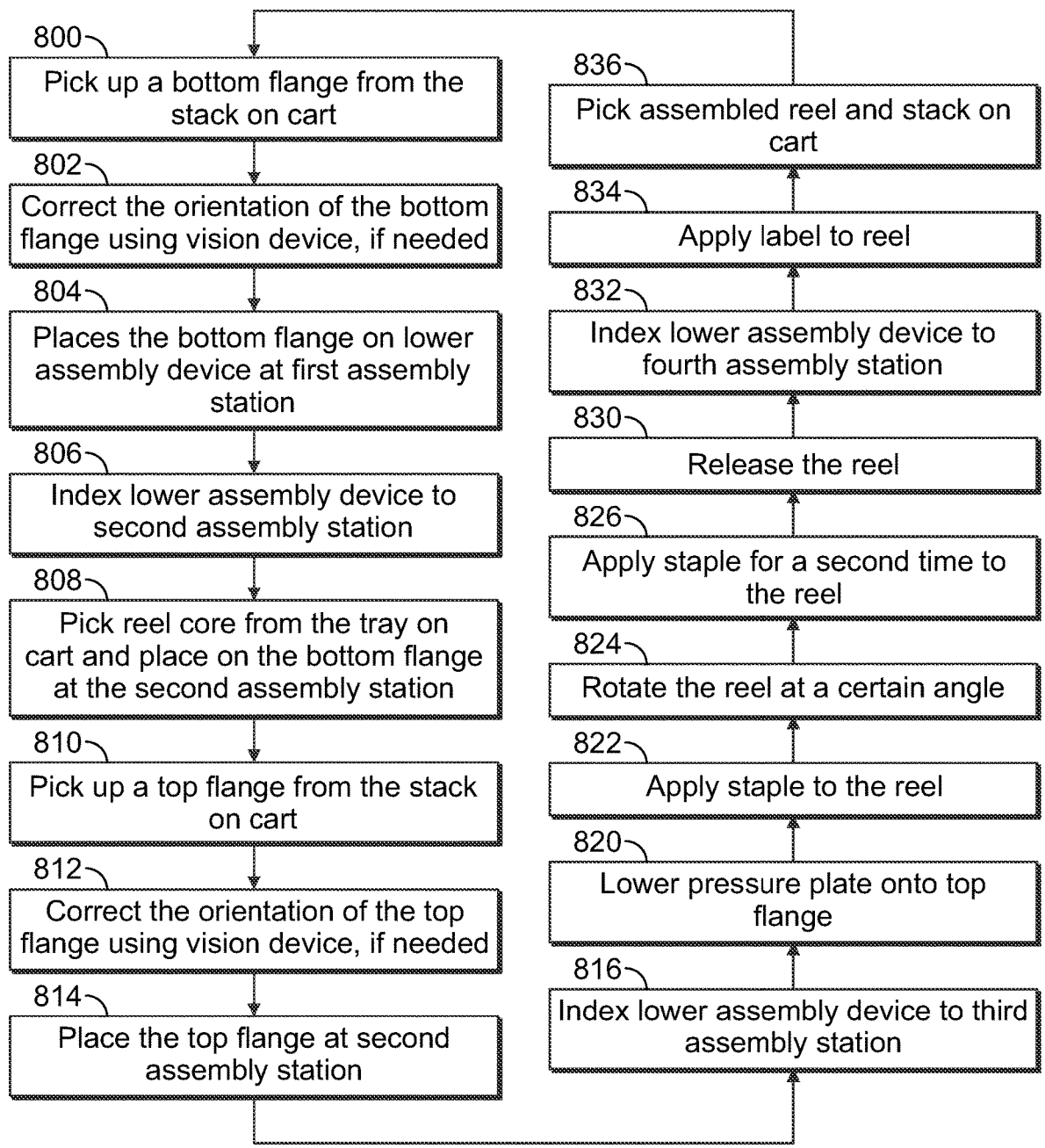
FIG. 8 is a method of assembling a reel using a reel assembly machine in accordance with an exemplary embodiment.

FIG. 8 is a method of assembling a reel using a reel assembly machine, such as the reel assembly device 100, in accordance with an exemplary embodiment. The method is described in relation to the reel assembly device 100 and the components illustrated in FIG. 1 and described herein. The method is not limited to use with the reel assembly device 100. Steps may be omitted, or other steps may be added in alternative embodiments. Optionally, the order of the steps may be rearranged in alternative embodiments. Optionally, one or more of the steps may be performed simultaneously, such as at different station of the reel assembly device 100.

The method includes the step of picking 800 a bottom flange from a stack on a cart. The bottom flange may be picked using a multiaxis robot manipulator. The method includes the step of correcting 802 the orientation of the bottom flange using imaging by a vision device, if needed. For example, the multiaxis robot manipulator may present the bottom flange to a camera to image the orientation of the bottom flange. The multiaxis robot manipulator controls movements of the bottom flange based on the orientation from the image. The method includes the step of placing 804 the bottom flange on a lower assembly device at a first assembly station. The lower assembly device may include a jig for locating the bottom flange relative to the lower assembly device. The orientation of the bottom flange is matched to the jig based on the image taken by the vision device to properly positioned the bottom flange at the first assembly station.

The method includes indexing 806 the lower assembly device to a second assembly station. In various embodiments, the lower assembly device is mounted to a rotary table. The indexing 806 is performed by rotating the rotary table a predetermined amount. For example, the rotary table may be indexed 90° to move the lower assembly device from the first assembly station to the second assembly station.

At step 808, the method includes picking up a reel core from a tray on a cart and placing the reel core on the bottom flange at the second assembly station. The reel core may be picked using a multiaxis robot manipulator. The multiaxis robot manipulator may be the same multiaxis robot manipulator used to pick up the bottom flange or may be a different multiaxis robot manipulator.

The method includes the step of picking 810 a top flange from a stack on a cart. The top flange may be picked using a multiaxis robot manipulator. The multiaxis robot manipulator may be the same multiaxis robot manipulator used to pick the bottom flange or the reel core or may be a different multiaxis robot manipulator. The method includes the step of correcting 812 the orientation of the top flange using imaging by a vision device, if needed. For example, the multiaxis robot manipulator may present the top flange to a camera to image the orientation of the top flange. The multiaxis robot manipulator controls movements of the top flange based on the orientation from the image. The method includes the step of placing 814 the top flange at the second assembly station. The top flange may be placed on top of the reel core and the bottom flange, which are supported by the lower assembly device. The top flange may be placed to interface with the jig to locate the top flange relative to the reel core and the bottom flange. The orientation of the top flange is matched to the jig based on the image taken by the vision device to properly positioned the top flange at the second assembly station.

The method includes indexing 816 the lower assembly device (with the bottom flange, the reel core, and the top flange) to a third assembly station. The indexing 816 may be performed by rotating the rotary table a predetermined amount, such as 90°, to move the lower assembly device from the second assembly station to the third assembly station. The indexing 816 moves the lower assembly device (with the bottom flange, the reel core, and the top flange) to an upper assembly device, which is operated in concert with the lower assembly device to couple the bottom flange and the top flange to the reel core. For example, the upper assembly device may be located at the third assembly station.

At step 820, the upper assembly device is operated to lower a pressure plate onto the top flange to apply positive pressure to the reel. At step 822, upper and lower staple guns apply staples to the reel. For example, the upper staple guns apply the staples to secure the top flange to the reel core and the lower staple guns apply the staples to secure the bottom flange to the reel core. At step 824, the reel is rotated relative to the lower assembly device and the upper assembly device. For example, a rotary plate of the lower assembly device may be rotated a predetermined amount, such as 45° (or another angular amount depending on the number of additional stapling steps desired). The jig, which holds the reel, may be rotated with the rotary plate to rotate the reel. At step 826, the upper and lower staple guns apply another set of staples to the reel.

At step 830, the upper assembly device releases from the reel. The pressure plate is lifted off of the top flange and moved back to a home position. In the home position, the upper assembly device does not engage the reel, which allows the reel to move away from the upper assembly device.

The method includes indexing 832 the lower assembly device (with the assembled reel) to a fourth assembly station. The indexing 832 may be performed by rotating the rotary table a predetermined amount, such as 90°, to move the lower assembly device from the third assembly station to the fourth assembly station. The indexing 832 moves the lower assembly device (with the bottom flange, the reel core, and the top flange) to a label applicator, which is located at the fourth assembly station. At step 834, a label is applied to the assembled reel. For example, the label applicator may print a label, which is applied to the top flange of the reel. Alternatively, the label applicator may print directly onto the top flange rather than printing onto a label.

The method includes the step of picking 840 the assembled reel from the lower assembly device and stacking the finished, assembled reel on a cart. The assembled reel may be picked using a multiaxis robot manipulator. The multiaxis robot manipulator may be the same multiaxis robot manipulator used to pick the bottom flange or other component or the reel core or may be a different multiaxis robot manipulator. In various embodiments, the multiaxis robot manipulator may pick up the assembled reel from the fourth assembly station. In other various embodiments, the finished assembled reel may be indexed from the fourth assembly station back to the first assembly station and the multiaxis robot manipulator may pick up the assembled reel from the first assembly station, thus opening up the lower assembly device to receive another bottom flange (for example, step 804).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A reel assembly machine for assembling a bottom flange and a top flange to a reel core of a reel, the reel assembly machine comprising:
    a lower assembly device including a support plate for supporting the bottom flange of the reel, the lower assembly device including a locating jig for positioning the bottom flange on the support plate, the lower assembly device including a lower staple gun configured to staple the bottom flange to the reel core; and an upper assembly device including a pressure plate configured to press against the top flange and hold the reel core between the bottom flange and the top flange, the upper assembly device including an upper staple gun configured to staple the top flange to the reel core.

2. A reel assembly machine for assembling a bottom flange and a top flange to a reel core of a reel, the reel assembly machine comprising:
- a base having a rotary table including a plurality of reel assembly locations, the rotary table rotating the reel assembly locations between a plurality of assembly stations;
- a part manipulator provided adjacent to at least one of the plurality of assembly stations, the part manipulator configured to move at least one of the bottom flange, the top flange, or the reel core to the corresponding assembly station of the plurality of assembly stations for assembly;
- a reel assembly device including a lower assembly device and an upper assembly device, the lower assembly device coupled to the rotary table of the base and being rotated between the plurality of assembly stations, the lower assembly device including a support plate for supporting the bottom flange of the reel, the lower assembly device including a locating jig for positioning the bottom flange on the support plate, the lower assembly device including a lower staple gun configured to staple the bottom flange to the reel core, the upper assembly device coupled to the base at the corresponding assembly station of the plurality of assembly stations, the upper assembly device including a pressure plate configured to press against the top flange and hold the reel core between the bottom flange and the top flange, the upper assembly device including an upper staple gun configured to staple the top flange to the reel core.

3. The reel assembly machine of claim 2, wherein the pressure plate is configured to compress the bottom flange, the top flange, and the reel core between the pressure plate and the support plate.

4. The reel assembly machine of claim 2, wherein the lower assembly device includes a rotary plate rotatable relative to the support plate, the rotary plate configured to rotate the bottom flange relative to the lower staple gun to allow stapling at different positions.

5. The reel assembly machine of claim 4, wherein the rotary plate is configured to rotate the top flange relative to the upper staple gun to allow stapling at different positions.

6. The reel assembly machine of claim 2, wherein the locating jig includes a locating pin configured to pass through the bottom flange and the top flange to interface with the bottom flange, the top flange, and the reel core to locate the reel relative to the support plate.

7. The reel assembly machine of claim 2, wherein the lower staple gun is one of a plurality of lower staple guns configured to staple the bottom flange to the reel core at multiple positions.

8. The reel assembly machine of claim 2, wherein the upper assembly device includes a rail mechanism, the upper assembly device including an actuator coupled to the pressure plate to slide the pressure plate along the rail mechanism.

9. The reel assembly machine of claim 2, wherein the at least one part manipulator is configured to stack the bottom flange, the reel core, and the top flange on the support plate, the locating jig positioning the bottom flange, the reel core, and the top flange relative to each other.

10. The reel assembly machine of claim 2, wherein the rotary table rotates the lower assembly device relative to the upper assembly device.

11. The reel assembly machine of claim 2, further comprising a vision device proximate to the at least one part manipulator, the vision device configured to image at least one of the bottom flange, the top flange, or the reel core held by the at least one part manipulator, the at least one part manipulator operated based on the image to control a position of the bottom flange, the top flange, or the reel core on the support plate.

12. The reel assembly machine of claim 2, further comprising a label applicator at one of the plurality of assembly stations, the rotary table rotating the lower assembly device to the label applicator for label application to the reel.

13. The reel assembly machine of claim 2, wherein the part manipulator includes an arm movable in three-dimensional space and an end effector at a distal end of the arm, the end effector configured to pick up the bottom flange, the top flange, or the reel core to move the bottom flange, the top flange, or the reel core to the support plate.

14. The reel assembly machine of claim 2, wherein the at least one part manipulator includes a first part manipulator and a second part manipulator, the first part manipulator configured to pick up the bottom flange and position the bottom flange on the support plate, the second part manipulator configured to pick up the reel core and position the reel core on the bottom flange, the second part manipulator configured to pick up the top flange and position the top flange on the reel core, the first part manipulator configured to pick up the assembled reel after the bottom flange is stable to the reel core and the top flange is stable to the reel core.

15. The reel assembly machine of claim 2, wherein the lower assembly device includes support columns coupled to the rotary table, the support columns holding the support plate at an elevated position above the lower staple gun.

16. The reel assembly machine of claim 2, further comprising:
- a bottom flange cart positioned adjacent the base and configured to hold the plurality of the bottom flanges;
- a top flange cart positioned adjacent the base and configured to hold a plurality of the top flanges;
- a reel core cart positioned adjacent the base and configured to hold a plurality of the reel course; and
- an assembled reel cart positioned adjacent the base configured to receive the assembled reels.

17. A method of assembling a reel comprising:
- loading a bottom flange of the reel onto a support plate of a lower assembly device;
- loading a reel core onto the bottom flange;
- loading a top flange onto the reel core;
- locating the bottom flange, the reel core and the top flange on the support plate using locating pins of a locating jig;
- pressing the top flange downward toward the reel core and the bottom flange using a pressure plate of an upper assembly device;
- stapling the bottom flange to the reel core using a lower staple gun; and
- stapling the top flange to the reel core using an upper staple gun.

18. The method of claim 17, further comprising rotating the lower assembly device between a plurality of assembly stations, said loading the bottom flange onto the support plate includes loading the bottom flange onto the support plate at a first assembly station, said loading the reel core onto the bottom flange includes loading the reel core onto the bottom flange at the second assembly station, said loading the top flange onto the reel core includes loading the top flange onto the reel core at the second assembly station, said pressing the top flange downward includes pressing the top flange downward at a third assembly station, said stapling the bottom flange to the reel core includes stapling the bottom flange to the reel core at the third assembly station, and said stapling the top flange to the reel core includes stapling the top flange to the reel core at the third assembly station.

19. The method of claim 17, wherein said stapling the bottom flange to the reel core includes stapling a first staple to the bottom flange and the reel core using the lower staple gun, rotating the bottom flange, the reel core and the top flange, and stapling a second staple to the bottom flange and the reel core using the lower staple gun, and wherein said stapling the top flange to the reel core includes stapling a third staple to the top flange and the reel core using the upper staple gun and stapling a fourth staple to the top flange in the reel core using the upper staple gun after the reel core and the top flange are rotated.

20. The method of claim 17, wherein said loading the bottom flange onto the support plate includes picking up the bottom flange from a cart using a part manipulator, said loading the reel core onto the bottom flange includes picking up the reel core from a cart using a part manipulator, said loading the top flange onto the reel core includes picking up the top flange from a cart using a part manipulator, the method further comprising removing the assembled reel from the lower assembly device using a part manipulator and loading the assembled reel onto a cart remote from the lower assembly device.

* * * * *